Jan. 9, 1945. C. RICHKER 2,366,805
CONVERSION OF HYDROCARBONS
Filed Feb. 4, 1943
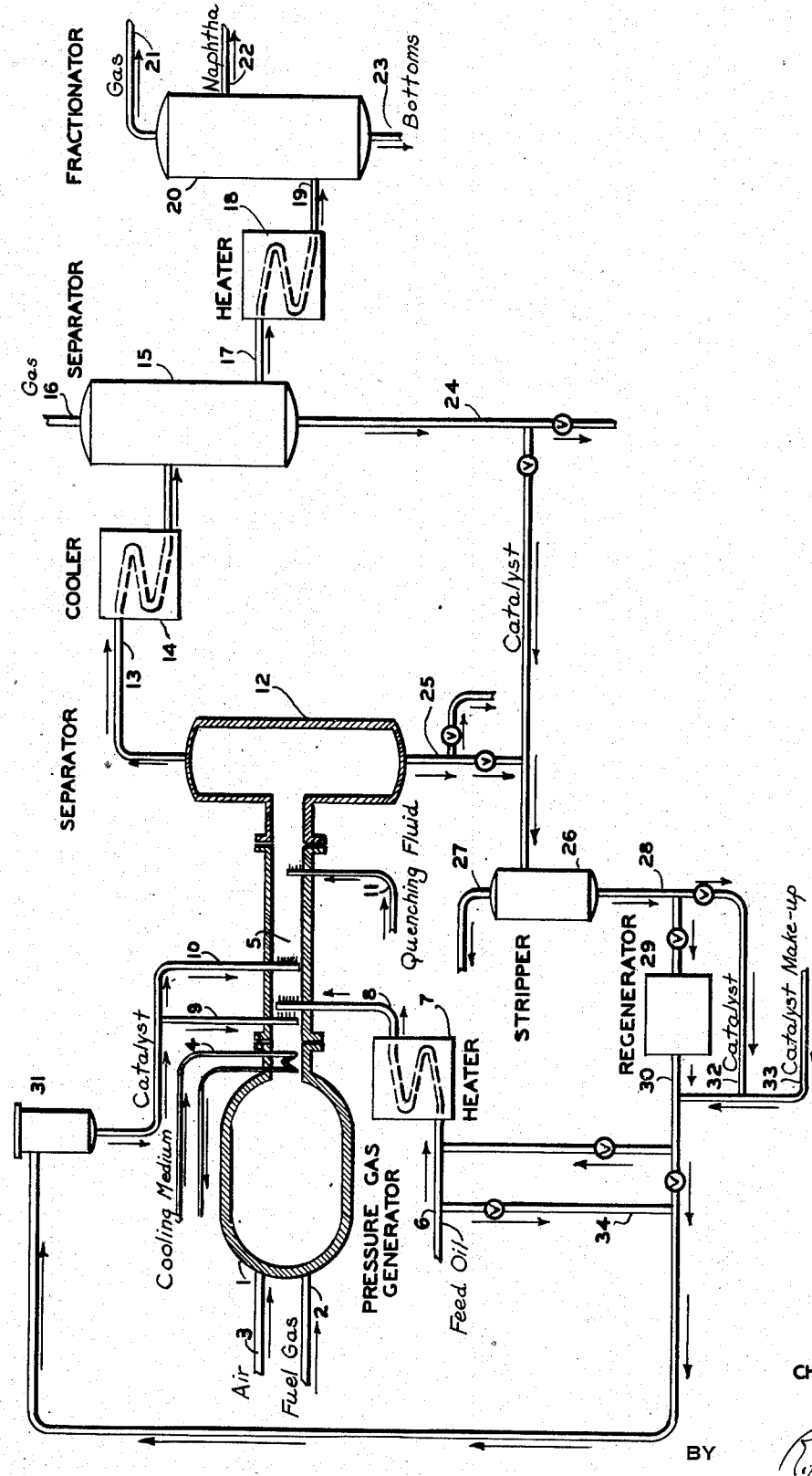
CHARLES RICHKER
INVENTOR
BY
His Attorney Patented Jan. 9, 1945

2,366,805

UNITED STATES PATENT OFFICE 2,366,805

CONVERSION OF HYDROCARBONS

Charles Richker, Port Arthur, Tex., assignor to The Texas Company, New York, N. Y., a corporation of Delaware Application February 4, 1943, Serial No. 474,643

4 Claims. (Cl. 196—52)

This invention relates to the conversion of hydrocarbons wherein the hydrocarbons are subjected to cracking at relatively high temperatures.

The invention contemplates a process which involves forming a body of substantially inert gas at a temperature sufficiently high to provide heat for carrying out the cracking reaction. A stream of this gas is passed through a reaction zone at high velocity. The hydrocarbons to be converted, advantageously in vapor form, are injected into the gas stream and uniformly distributed therethrough. The hydrocarbons and gas flow through the reaction zone and are maintained under conversion conditions of high temperature for a brief period of time following which the temperature of the mixed stream is reduced to substantially inhibit further conversion of the hydrocarbons.

The cooled stream is passed from the reaction zone for further treatment including separation therefrom of the gas and fractionation of the cracked hydrocarbon products.

According to a preferred form of the invention the cracking reaction is effected in the presence of a finely divided solid contact material which may be injected into the stream of highly heated gas so that the hot contact material and hydrocarbons are maintained in the presence of each other as they flow through the reaction zone. The contact material, advantageously is of relatively low activity. As previously stated the reaction mixture after brief exposure to the elevated temperatures is cooled so as to inhibit further cracking and is then passed to a separating zone wherein the contact material may be separated from the hydrocarbons and gas. The catalyst after separation from the reaction mixture can be withdrawn and recycled to the conversion reaction. Prior to return to the conversion reaction the recycled catalyst may be subjected to regeneration all or in part.

The converted hydrocabons and gas may be subjected to further cooling prior to introduction to a separate zone wherein substantially all of the gas may be separated from the converted hydrocarbons. The hydrocarbons from which the gas has been removed may then be subjected to fractionation to form fractions of any desired character.

More specifically the invention involves subjecting a combustible material such as fuel gas or natural gas to combustion under elevated pressure as, for example, in the range about 20 to 150 pounds per square inch, and under conditions so as to form a substantially inert flue gas. The combustion is advantageously carried out under neutral or slightly reducing flame conditions so that the resulting flue gas contains no free oxygen and may contain some carbon monoxide. The resulting flue gas may be at temperatures of the order of 3000° F. and therefore, it is contemplated reducing the temperature of the gas leaving the combustion furnace to a temperature such that the temperature in the reaction zone will be in the range about 1100 to 1400° F. This stream of gas is continuously passed through a tubular reaction zone at relatively high velocity.

A powdered contact or catalytic material is injected into this flowing stream of hot gas at a point near the inlet of the gas to the reaction zone in such manner as to be uniformly distributed throughout the flowing stream. Likewise a stream of vaporized feed hydrocarbon is injected into the stream advantageously at a point subsequent to that at which the catalyst has been injected. The hydrocarbon is also injected in such manner as to be uniformly distributed throughout the flowing stream of hot gas and powdered catalyst.

The catalyst may be injected in the form of a slurry in a suitable liquid such as water or a small part of the feed oil or may be injected in the form of a dry powder. The oil may be heated to a temperature of 700 to 800° F. prior to injection in the gas stream. It is preferable, however, to vaporize the oil completely before injection. The preheating of the oil should be carried out under conditions such that it undergoes no substantial cracking prior to contact with the hot gas.

The temperature of streams entering the reaction zone may be controlled in various ways as will be discussed later.

The sensible heat of the combustion gas is sufficient to provide the necessary heat for bringing the introduced feed oil up to the desired conversion temperature and for effecting the conversion.

In accordance with the invention the hydrocarbons are subjected to contact with the contact material at the relatively high temperatures for a brief period of time of not more than about 0.1 to 3 seconds. The size of the reaction zone and the rates of fluid flow are thus adjusted so as to permit the desired brief conversion period prior to removal of the hydrocabons from the reaction zone. The effluent stream of gas, hydrocarbons and catalyst is subjected to abrupt cooling either just before or just as it leaves the reaction zone so as to reduce the temperature to a point at which the conversion reaction is substantially inhibited.

This sudden cooling may be effected by injecting a stream of cooling fluid such as water or oil into the stream of reaction mixture as it leaves the reaction zone.

Under the high temperature conditions prevailing in the reaction zone it is desirable that the activity of the catalyst used be such that the extent of conversion to gas and carbon is not excessive. Therefore, it is contemplated that a cracking catalyst of somewhat lower activity than normally used should be employed. With a highly active catalyst employed under the conditions of temperature contemplated in the present invention the normal tendency would be in the direction of excessive carbon and gas formation. It is desired to employ the catalyst so as to obtain a high ratio of gasoline to carbon of the order of about 55 pounds of gasoline and not less than about 18 pounds of gasoline per pound of carbon.

It is contemplated that a relatively active cracking catalyst may be employed by subjecting the catalyst initially to contact with the hot flue gas prior to contact with the oil undergoing conversion. In this way the fine pores of the catalyst absorb relatively inert gas and decrease the total active surface area, thereby minimizing its activity so that upon contact with the hydrocarbons the catalyst will effect rupture of the hydrocarbon bonds at high conversion levels with relatively low carbon formation.

When a relatively inactive catalyst is employed it is unnecessary to introduce it so as to effect the above-mentioned initial contact with the hot flue gas prior to contact with hydrocarbons.

A relatively inactive catalyst may be defined as one which, when a gas oil boiling in the range about 400 to 750° F. is passed in vapor form through a fixed bed of the catalyst with a space velocity of 2 at a temperature of 950° F. for a period of 2 hours produces a cracked gasoline yield of not more than about 10% by volume of the feed oil, the gasoline in question being a debutanized naphtha having an end point of about 400° F. and a clear CFRM octane number of about 78 to 79. Space velocity is regarded as the volume of liquid feed oil measured at about 60° F. charged per hour per volume of catalyst.

The amount of catalyst employed in the reaction may range from about 0.1 to 2.0 pounds of catalyst per pound of oil, the more active the catalyst the smaller the ratio of catalyst to oil. Moreover, the catalyst is advantageously employed in finely divided form as, for example, in the form of powder. It is also contemplated that instead of employing a solid type of catalyst gaseous or liquid catalyst agents may be used, for example, a catalyst such as boron trifluoride or carbon tetrachloride. Examples of a relatively inactive catalyst would comprise alumina, silica, kieselguhr, and certain aluminum hydrosilicates and clays, particularly non-swelling clays of the Texas sub-bentonite type such as Lena clay.

With the more active of this group of catalysts such as alumina, at a reaction temperature of about 1200° F. the amount of catalyst used would be about 0.1 pound of catalyst per pound of oil under which conditions the following approximate yields are obtained:

Naphtha, per cent by volume, basis feed oil____ 55
Gas oil, per cent by volume_____ 33
Gas, per cent by weight_____ 13
Carbon, per cent by weight_____ 3

The naphtha so obtained is a debutanized naphtha of about 400° F. end point, having a clear CFRM octane number of about 82.

To obtain the above yields with the least active of this group of catalysts such as kieselguhr and silica, somewhat higher temperature would be employed, for example, about 1350° F. and the catalyst to oil ratio would amount to 1 pound of catalyst per pound of feed oil.

In order to describe the invention further, reference will now be made to the accompanying drawing comprising a flow diagram illustrating one mode of practicing the process.

The numeral 1 in the drawing designates a pressure gas generator of more or less conventional design and adapted for effecting combustion of fuel gas under elevated pressure as, for example, pressures above atmospheric and up to several hundred pounds. Fuel gas such as natural gas or refinery gas is conducted from a source not shown through a pipe 2 and introduced to the interior of the generator. Likewise a stream of air is introduced from a source not shown through a pipe 3. Instead of air, liquid oxygen may be used. The amount of air or oxygen and fuel gas is proportioned so as to effect combustion preferably under neutral or slightly reducing flame conditions. The object is to produce a neutral flue gas containing substantially no free oxygen.

The products of combustion may be at a temperature of 3000° F. or more. Therefore, it is advantageous to reduce the temperature of the resulting flue gas. This cooling may be accomplished by a cooling coil 4 located at or near the discharge outlet from the generator through which coil a suitable cooling medium may be circulated. Water or steam, for example, may be passed through the coil in order to generate superheated steam which may be used at subsequent points in the process. Other cooling agents may be employed.

Control of the temperature may be accomplished also by injecting the catalyst in the form of a slurry in water or in oil, utilizing the heat of vaporization of the slurry liquid to reduce the gas temperature.

The injected catalyst itself provides an effective cooling medium. Usually the catalyst or contact material is regenerated by burning and then recycled. The recycled catalyst is of relatively lower temperature than the gaseous products of combustion and therefore advantage may be taken of it as a cooling agent. In this way the injected catalyst is brought up to the desired reaction temperature.

The hot flue gas after leaving the generator passes through a reaction zone 5. This reaction zone may comprise a relatively short conduit suitably insulated against loss of heat by radiation and convection and of sufficient size to cause the flue gas to flow in a confined stream at high velocity.

The feed oil such as the gas oil is conducted from a source not shown through a pipe 6 to a heater 7 wherein the oil is heated under non-cracking conditions to a temperature which may be in the range 700 to 800° F. The feed is completely vaporized with no cracking, the temperature at which the oil is injected being above the dew point of the oil at the pressure prevailing in the system. The heater 7 is advantageously designed so that it will have a soaking volume factor in the range 0.05 to 0.1 and not in excess of 0.5. The method of determining the soaking volume factor of a heater has been described in pending application, Serial No. 468,527.

The heated feed oil is conducted through a pipe 8 to the interior of the reaction zone 5. The pipe 8 advantageously terminates in a suitable spray or other distributing device positioned within the reaction zone so as to effect uniform distribution of the feed oil vapors through the flowing stream of flue gas.

The sensible heat of the hot flue gas is utilized to bring the injected feed oil up to the cracking temperature and to effect the cracking reaction.

The catalyst which may be in the form of a fine powder or in the form of a slurry is introduced to the reaction zone through a pipe 9 or pipe 10 as the case may be. If the catalyst is relatively active it is introduced through the pipe 9 while if the catalyst is relatively inactive it is introduced through the pipe 10.

As in the case of the injected oil the pipes 9 and 10 terminate in suitable distributing means within the reaction zone so as to effect uniform distribution of the catalyst in the stream of gas and vapor passing through the reaction zone. The path of travel through the reaction zone is relatively short so that the hot gas, catalyst and hydrocarbon vapors remain in the presence of each other under cracking conditions for a very brief period of time, not more than several seconds and in the range about 0.1 to 3 seconds. Thereafter the mixed stream is abruptly reduced in temperature by contact with a suitable quenching fluid. The quenching fluid may be introduced from a source not shown through a pipe 11 which also terminates in a suitable distributor advantageously within the discharge portion of the reaction zone 5. The quenching fluid may be a portion of the feed oil or some other liquid such as recycled oil or even water.

The quenched mixture at a temperature of about 700 to 800° F. is then passed into a separator 12 which provides means for the settling of a large proportion of the catalyst from the mixture. While not shown it is contemplated that the separator 12 may be of any suitable design and may be provided with dust separating means in the upper portion, or instead the effluent vapors may be passed through suitable dust separating or precipitating means.

The effluent vapors comprising flue gas and hydrocarbons may then be passed through a pipe 13 and cooler 14 wherein the mixture is reduced to a temperature of 100° F. while still under pressure which pressure may be about 100 pounds per square inch gauge. The cooled mixture under pressure flows into a separator 15. Under the conditions prevailing within the separator 15 substantially all of the flue gas can be separated as a gas which is discharged through a pipe 16. The hydrocarbons will be in a liquefied condition and are conducted through a pipe 17 through a heater 18. From the heater 18 the hydrocarbon stream is conducted through a pipe 19 to a fractionating unit 20. The fractionation may be carried out so as to separate the hydrocarbon products into any desired number of fractions. For example, a gaseous fraction may be removed and discharged through a pipe 21; a naphtha fraction comprising gasoline through a pipe 22 while higher boiling material is discharged through a pipe 23.

In the separator 15 provision is made for the separation of a further quantity of catalyst which may have been entrained in the stream passing through the cooler 14. This entrained catalyst is then collected in the bottom of the separator 15 and discharged therefrom through a pipe 24. In similar manner the catalyst precipitated in the separator 12 is discharged through a pipe 25. This catalyst may be discharged from the system or may be recycled all or in part.

Prior to such recycling the catalyst can be passed to a stripper 26 wherein it is subjected to contact with steam or other gaseous stripping agent for the purpose of stripping out residual hydrocarbons which would be discharged through a pipe 27.

Instead of stripping it is contemplated that filtration may be employed.

The stripped catalyst is then conducted through a pipe 28 and if desired passed to a suitable regenerator 29. The regenerator may be a furnace of the Nichols-Herreshoff type. The catalyst passes from the regenerator through a pipe 30 which leads to a storage tank 31, to which the catalyst may be returned in a dry powder form either by way of mechanical or pneumatic conveyors.

The recycled catalyst may be at a temperature in the range 900 to 1100° F. or even lower, and thus upon introduction to the reaction zone through the pipe 9 provides a means of cooling, or at least partially cooling, the flue gas prior to contact with the injected oil vapors.

As indicated from the drawing all or a portion of the catalyst may be recycled without regeneration, in which case it bypasses the regenerator 29 through a pipe 32. Make-up catalyst can be added at this point through a pipe 33.

Also as indicated in the drawing a portion of the feed oil may be by-passed through a pipe 34 and mixed with the catalyst to form a slurry which is later injected into the reaction zone.

If desired the catalyst may be injected into the stream of feed oil passing through the heater 7.

While a specific arrangement of apparatus and method of flow has been described in the drawing, nevertheless it is contemplated that the apparatus design and particular method of flow employed may vary considerably from that described so that it is not intended to limit the invention to the specific method of flow illustrated in the drawing. Moreover, it is contemplated that operating conditions of temperature and pressure, ratio of catalyst to oil, etc., may vary from that mentioned above.

The feed stock employed in the process will depend upon the product desired. For the production of motor gasoline it is contemplated charging a virgin distillate gas oil having an end point not greater than about 850° F. Where it is desired to produce a product rich in aromatic hydrocarbons it may comprise cracked gas oil produced in pyrolytic cracking operations. A feed oil rich in heavy aromatics and cyclohexane or other naphthenes may be employed when it is desired to produce benzene and toluene in substantial amounts. The process is applicable to the cracking of refractory oils such as the extracts obtained in solvent refining of lubricating oil stocks.

While not shown in the drawing it is contemplated that recycling of various fractions of the cracked products may be practiced. For example, normally gaseous hydrocarbons produced in the process may be recycled to effect a gas reversion reaction. In addition fixed gases produced in the process including methane may be recycled to the pressure gas regenerator and there used as fuel gas.

Obviously many modifications and variations of the invention as above set forth may be made without departing from the spirit and scope thereof, and therefore only such limitations should be imposed as are indicated by the appended claims.

I claim:

1. A continuous method of cracking hydrocarbon oil which comprises forming in a combustion zone combustion gases substantially free from uncombined oxygen and containing some carbon monoxide at elevated temperature, passing said gases from the combustion zone in a confined stream through a relatively short tubular reactor at high linear velocity, injecting into the stream after introduction to said reactor relatively cool powdered catalyst of such activity that, when gas oil vapor is passed through a fixed bed of such catalyst at a temperature of 950° F. and at a space velocity of two for a period of two hours, a debutanized naphtha yield of not more than about ten volume per cent basis gas oil is obtained, then injecting into the flowing mixture of gas and catalyst a stream of gas oil vapor to be cracked, said vapor being preheated under substantially non-cracking conditions to a temperature in the range about 700 to 800° F., reducing the temperature of said combustion gases passing from the combustion zone to the reactor so that the temperature within the reaction zone of said reactor will be in the range about 1100 to 1400° F. maintaining the oil vapors and catalyst in contact at the relatively high temperature for not more than about 0.1 to 3 seconds, then injecting into said stream prior to leaving the reactor a stream of relatively cool liquid sufficient to reduce the stream to a temperature in the range 700 to 800° F., thereafter discharging the cooled stream comprising gas, powder and hydrocarbons from the reactor, and separating powder from the gas and hydrocarbons.

2. The process according to claim 1 in which the powdered catalyst is introduced to the reactor in the proportion of about 0.1 to 2.0 pounds of catalyst per pound of oil undergoing conversion.

3. The process according to claim 1 in which residual hydrocarbons are stripped from the separated catalyst and the stripped catalyst powder recycled at a temperature in the range 900 to 1100° F. to said tubular reactor.

4. A continuous method of cracking hydrocarbon oil which comprises forming combustion gases in a zone of combustion at elevated temperatures above 1400° F., passing said gases at elevated temperature from the combustion zone in a confined stream through a relatively short tubular reactor at high linear velocity, injecting into the stream after introduction to said reactor relatively cool powdered catalyst of such activity that, when gas oil vapor is passed through a fixed bed of such catalyst at a temperature of 950° F. and at a space velocity of two for a period of two hours, a debutanized naphtha yield of not more than about ten volume per cent basis gas oil is obtained, then injecting into the flowing mixture of gas and catalyst a stream of gas oil vapor to be cracked, said vapor being preheated under substantially non-cracking conditions to a temperature in the range about 700 to 800° F., reducing the temperature of said combustion gases passing from the combustion zone to the reactor so that the temperature within the reaction zone of said reactor will be in the range about 1100 to 1400° F., maintaining the oil vapors and catalyst in contact at the relatively high temperature for not more than about 0.1 to 3 seconds, then injecting into said stream prior to leaving the reactor a stream of relatively cool liquid sufficient to reduce the stream to a temperature in the range 700 to 800° F., thereafter discharging the cooled stream comprising gas, powder and hydrocarbons from the reactor, and separating powder from the gas and hydrocarbons.

CHARLES RICHKER.